(12) United States Patent
Salter et al.

(10) Patent No.: US 10,047,911 B2
(45) Date of Patent: Aug. 14, 2018

(54) PHOTOLUMINESCENT EMISSION SYSTEM

(71) Applicant: Ford Global Technologies, LLC, Dearborn, MI (US)

(72) Inventors: Stuart C. Salter, White Lake, MI (US); Paul Kenneth Dellock, Northville, MI (US); Talat Karmo, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/252,327

(22) Filed: Aug. 31, 2016

(65) Prior Publication Data

US 2018/0058635 A1  Mar. 1, 2018

(51) Int. Cl.
*F01N 5/02* (2006.01)
*F21K 2/00* (2006.01)
*B60Q 1/26* (2006.01)

(52) U.S. Cl.
CPC ............ *F21K 2/005* (2013.01); *B60Q 1/26* (2013.01); *B60Q 1/2688* (2013.01); *F01N 5/02* (2013.01)

(58) Field of Classification Search
CPC .......... F01N 13/082; F01N 5/02; F01N 5/025; F01N 5/00; F21K 2/005; B60Q 1/26; B60Q 1/0023; B60Q 1/0094; B60Q 1/2688; B60Q 1/2696; H01L 35/30; H01L 35/32; G02B 6/0005
See application file for complete search history.

(56) References Cited

U.S. PATENT DOCUMENTS

| 2,486,859 | A | 11/1949 | Meijer et al. |
|---|---|---|---|
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Anh Mai
*Assistant Examiner* — Fatima Farokhrooz
(74) *Attorney, Agent, or Firm* — Jason Rogers; Price Heneveld LLP

(57) ABSTRACT

A vehicle emissions system is provided that includes a tail pipe configured to emit a first emission, a heat shield positioned proximate the tail pipe having a shield substrate. A semiconductor layer is positioned on the shield substrate and configured to convert the first emission into a second emission. An overmold is positioned over the semiconductor layer.

17 Claims, 4 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,030,624 B2 | 10/2011 | Kalish et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0047159 A1* | 3/2004 | Lee ............ B60Q 1/2688 362/487 |
| 2004/0213088 A1 | 10/2004 | Fuwausa |
| 2005/0036327 A1* | 2/2005 | Patel ................ B60Q 1/32 362/487 |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0268714 A1 | 11/2007 | Chen et al. |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0068322 A1* | 3/2011 | Pickett .................. C09K 11/02 257/13 |
| 2011/0303940 A1 | 12/2011 | Lee et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0160454 A1 | 6/2015 | Bhakta |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0012192 A1* | 1/2017 | Johnson ................ H01L 35/30 |
| 2017/0045666 A1* | 2/2017 | Vasylyev ............. G02B 6/0028 |
| 2017/0158125 A1 | 6/2017 | Schuett et al. |

FOREIGN PATENT DOCUMENTS

| | | |
|---|---|---|
| CN | 201193011 Y | 2/2009 |
| CN | 203269284 | 11/2013 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 202011109169 | 5/2012 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

PHOTOLUMINESCENT EMISSION SYSTEM

FIELD OF THE INVENTION

The present disclosure generally relates to emission systems, and more particularly, to vehicles having photoluminescent emission systems.

BACKGROUND OF THE INVENTION

Illumination systems used in vehicles may offer a unique and attractive viewing experience. It is therefore desired to incorporate such illumination systems in portions of vehicles to provide accent and functional lighting.

SUMMARY OF THE INVENTION

According to one aspect of the present invention, a vehicle emissions system is provided that includes a tail pipe configured to emit a first emission. A heat shield positioned proximate the tail pipe includes a shield substrate. A semiconductor layer is positioned on the shield substrate. The semiconductor layer is configured to convert the first emission into a second emission. An overmold is positioned over the semiconductor layer.

According to another aspect of the present invention, a vehicle is provided that includes an emissions component configured to emit a first emission having a wavelength greater than about 800 nm. A heat shield is positioned proximate the emissions component. A light source is positioned on the heat shield and is configured to absorb the first emission and emit a second emission.

According to yet another aspect of the present invention, a vehicle is provided that includes a tail pipe configured to emit a first emission. A heat shield is positioned proximate the tail pipe. A semiconductor layer is positioned proximate the heat shield and configured to absorb the first emission and emit a second emission.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
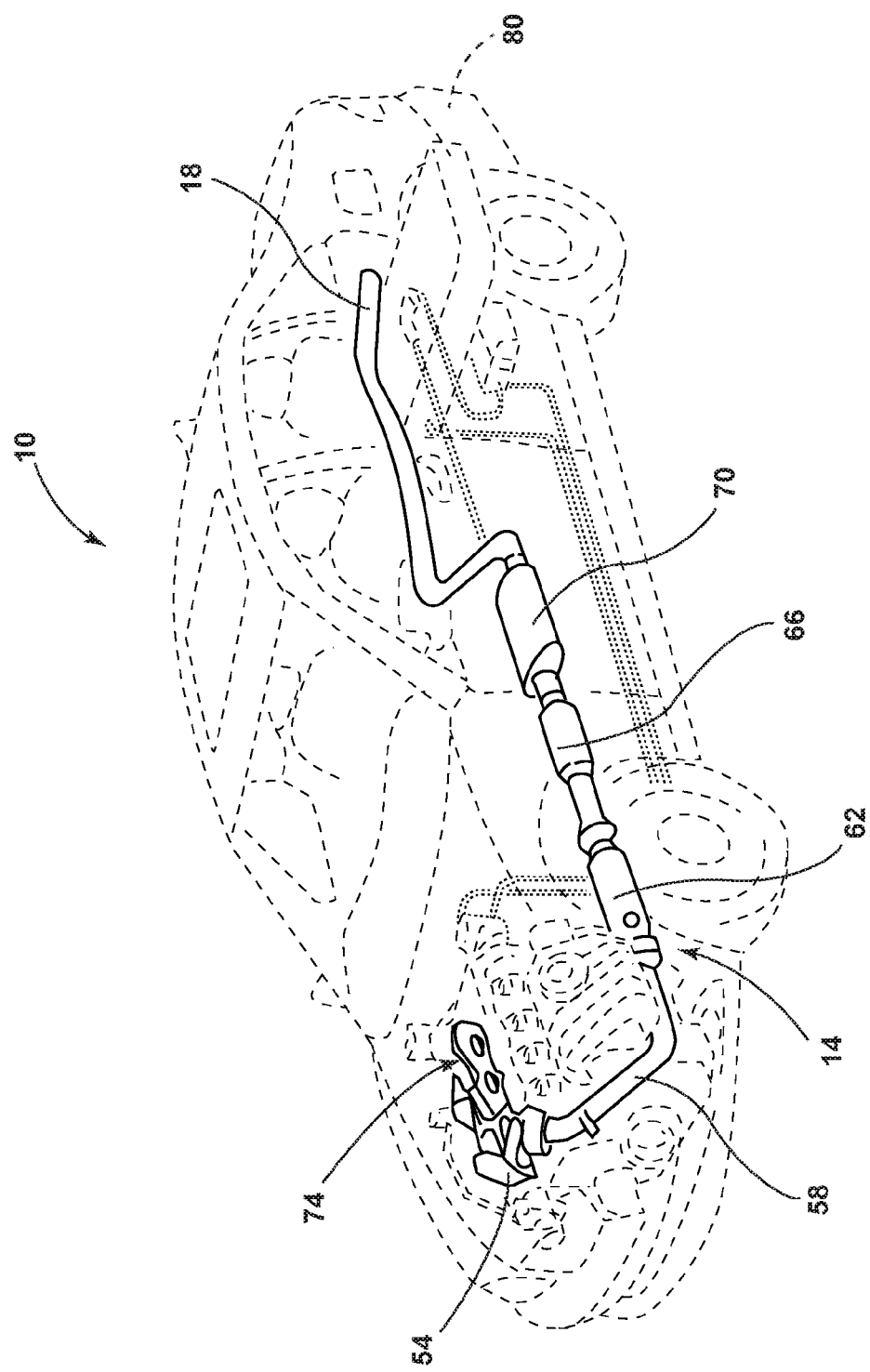
FIG. 1 is front perspective view of a vehicle having an emissions system, according to one embodiment.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring now to FIGS. 1-4, reference numeral 10 generally designates a vehicle having an emissions system 14. The emissions system 14 includes a tail pipe 18 positioned at a rear of the vehicle 10. According to various embodiments, the tail pipe 18 may be configured to emit a first emission 22. A heat shield 26 is positioned proximate the tail pipe 18 and includes a shield substrate 30 defining at least one surface 34. A semiconductor layer 38 is configured to convert the first emission 22 into a second emission 42. In other words, the semiconductor layer 38 is configured to absorb the first emission 22 and emit the second emission 42. An optional overmold 46 is positioned over the semiconductor layer 38.

Referring now to FIG. 1, as explained above, the vehicle 10 includes the emissions system 14. The emissions system 14 includes a plurality of emissions system components including an exhaust manifold 54, an exhaust down pipe 58 and catalytic converter 62, a resonator 66, a muffler 70, and the tail pipe 18. According to various embodiments, the emissions system 14 is coupled to an engine 74. The engine 74 is configured to combust fuel and oxygen to produce a locomotive force for the vehicle 10. During combustion of the fuel and oxygen, heated exhaust gases are generated and passed from the engine 74 into the emissions system 14. The heated exhaust gases travel through the emissions system 14 toward the tailpipe 18 and are ejected behind the rear of the vehicle 10. In operation, the heat from the exhaust gases is transferred to the emissions system components causing them to heat up. After prolonged use of the engine 74, and therefore passing of the heat exhaust gases through the emissions system 14, the exhaust emissions components may be heated to a temperature greater than about 100° C., 200° C., 300° C., 400° C., 500° C., 600° C. or greater than about 700° C. As the components of the emissions system 14 are heated, thermal radiation may be emitted from the components (e.g., the tail pipe 18) as the first emission 22. The thermal radiation of the first emission 22 may be in the infrared, or visible, bands of the electromagnetic spectrum. For example, infrared embodiments of the first emission 22 may have a wavelength less than about 1500 nm, 1400 nm, 1300 nm, 1200 nm, 1100 nm, 1000 nm, 900 nm, 800 nm, or about 750 nm. As explained in greater detail below, the first emission 22 (e.g., infrared light having a sufficiently low wavelength) may be used to excite the semiconductor layer 38 into emitting the second emission 42 at a shorter wavelength (e.g., visible light) than the first emission 22.

Figure 2:
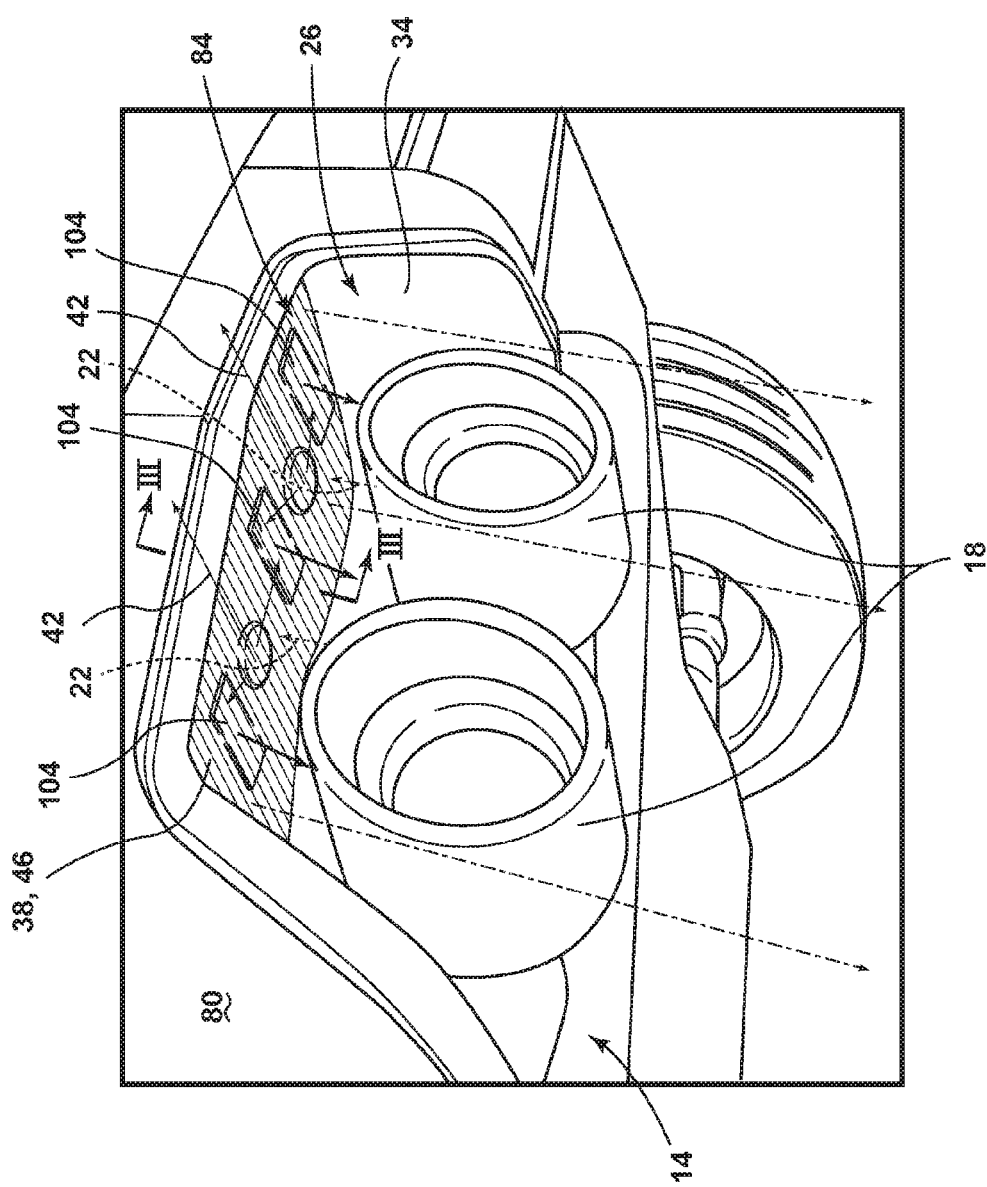
FIG. 2 is a perspective view of a rear of the vehicle, according to one embodiment.

Referring now to FIG. 2, the rear of the vehicle 10 may include a bumper 80. In the depicted embodiment, the bumper 80 may include a cutaway portion in which the heat shield 26 is positioned above the tail pipe 18. The heat shield 26 may be used to protect the material of the bumper 80 from the high temperatures experienced by the tail pipe 18. The heat from the tail pipe 18 may be transferred to the heat shield 26 and the bumper 80 via convective heating or through the first emission 22. Positioned on the surface 34 of the heat shield 26 may be a light source 84. According to various embodiments, the light source 84 may be a passive light source. For example, the light source 84 may not utilize electricity and may not include associated electrical connections and wiring of traditional lights. The light source 84 may include the semiconductor layer 38 and the overmold 46. The light source 84 is configured to emit the second emission 42 in a downward and rearward orientation relative to the vehicle 10. For example, the light source 84 may emit the second emission 42 in a downward manner to illuminate a space under the vehicle 10. The light source 84 may be positioned on a portion (e.g., as depicted) or all of the heat shield 26. It will be understood that a greater area of coverage by the light source 84 on the heat shield 26 may result in increased illumination of the space under the vehicle 10 as well as an increased emission of the second emission 42 rearward of the vehicle 10.

Figure 3:
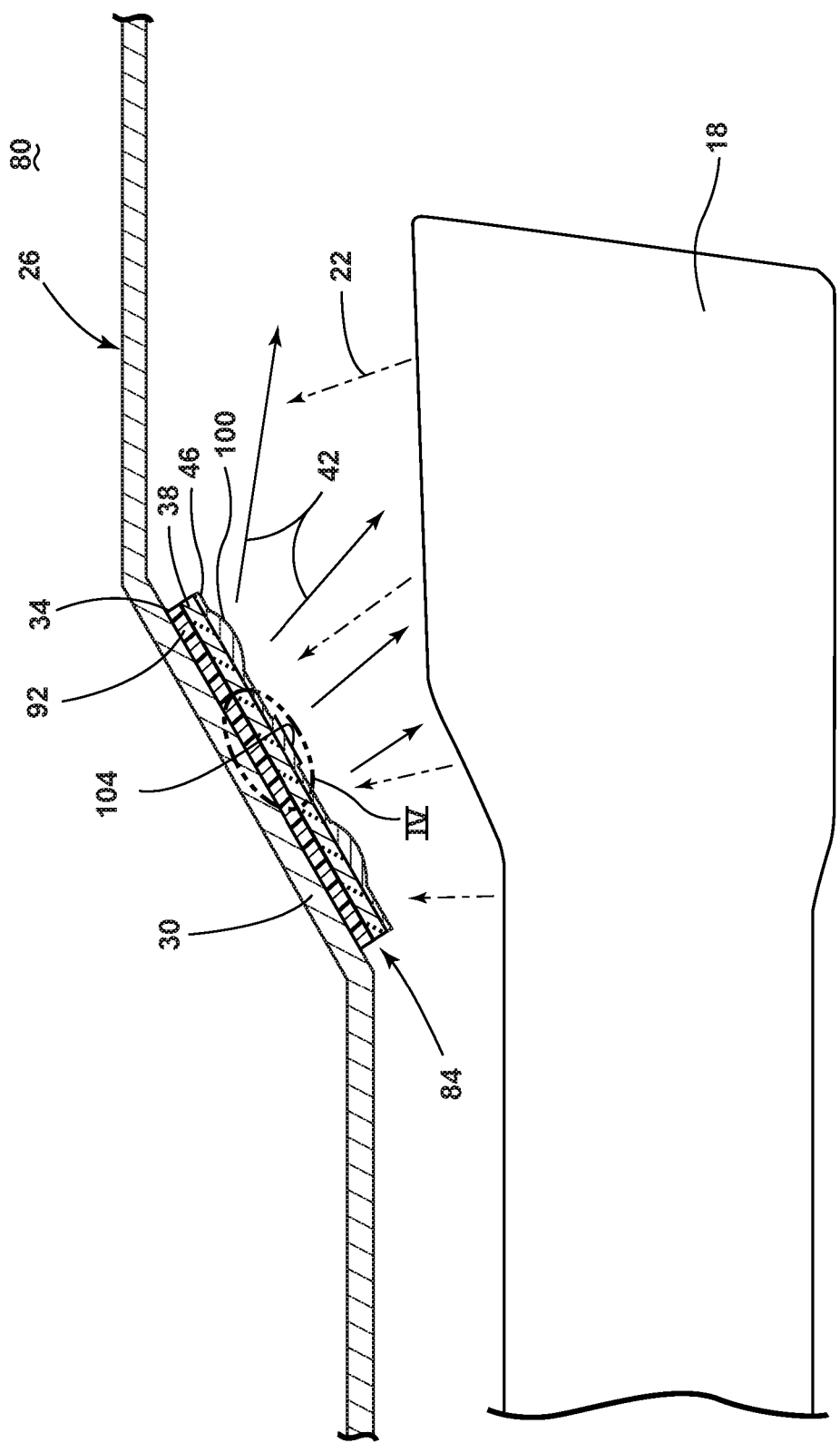
FIG. 3 is a cross-sectional view of the emissions system taken at line III of FIG. 2.
Figure 4:
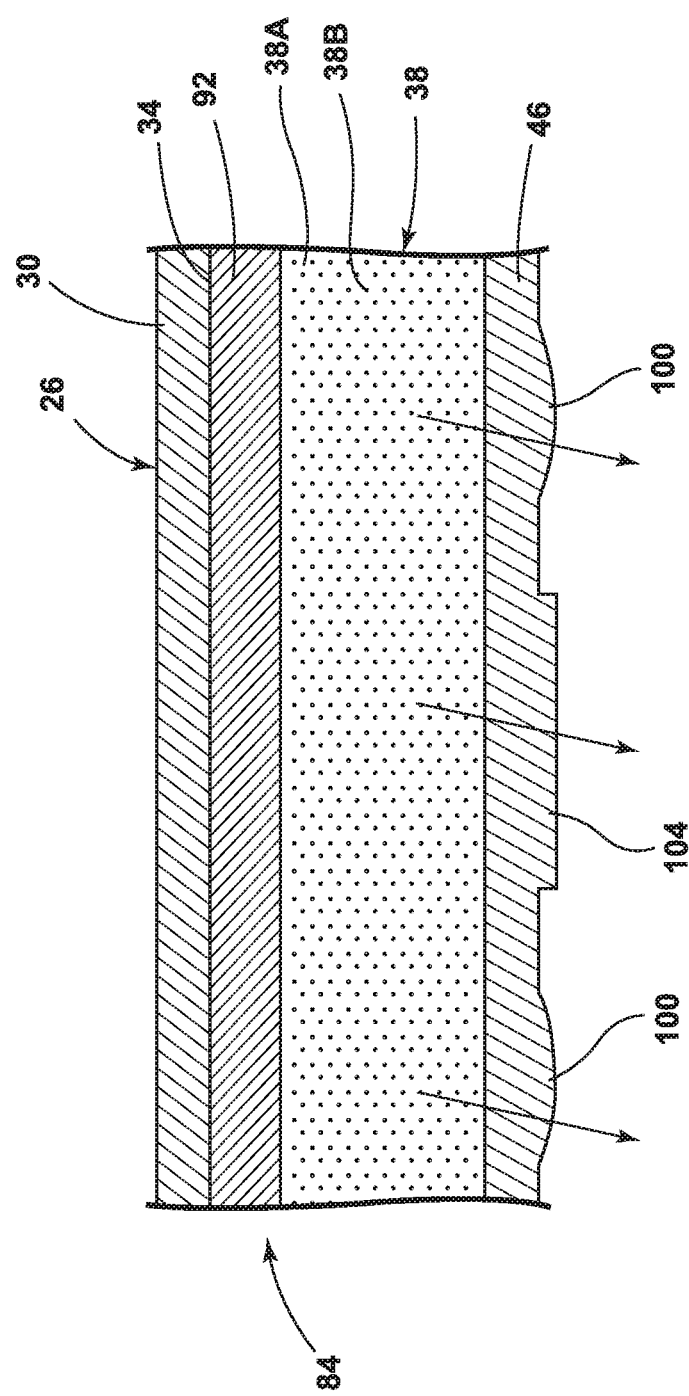
FIG. 4 an enhanced view taken as section IV of FIG. 3, according to one embodiment.

Referring now to FIGS. 3 and 4, the light source 84 is depicted in a multi-layer configuration positioned on the heat shield 26. The light source 84 includes a tie layer 92, the semiconductor layer 38 and the overmold 46. The shield substrate 30 may be formed of a metal, polymer and/or ceramic material configured to withstand both the environmental conditions experienced by the vehicle 10 as well as the high heat and radiative emission (e.g., the first emission 22) from the tail pipe 18. Positioned on the surface 34 of the shield substrate 30 is the tie layer 92. The tie layer 92 may be an adhesive material (e.g., a clear or otherwise pressure sensitive adhesive) configured to attach the semiconductor layer 38 to the surface 34. It will be understood that one or more fastening or attachment structures may be used in addition to or instead of the tie layer 92. For example, the tie layer 92 may be replaced with a light source substrate having one or mechanical fasteners (e.g., integrally defined) configured to attach the light source 84 to the heat shield 26.

As explained above, the semiconductor layer 38 is configured to emit light. According to various embodiments, the semiconductor layer 38 may be configured to emit light in response to receiving an excitation emission. The semiconductor layer 38 may include a binder 38A and a photoluminescent semiconductor material 38B. The binder 38A suspends the photoluminescent semiconductor material 38B. The binder 38A may be an optically transparent or translucent material such as polymethylmethacrylate, nylon, polycarbonate, polyester and/or polyvinyl chloride can also be used. The photoluminescent semiconductor material 38B may include one or more quantum dots. Quantum dots are nanoscale semiconductor devices that tightly confine either electrons or electron holes in all three spatial dimensions and may be photoluminescent. The photoluminescence of a quantum dot can be manipulated to specific wavelengths by controlling the particle diameter of the quantum dots. Quantum dots may have a radius, or a distance half of their longest length, in the range of between about 1 nm and about 10 nm, or between about 2 nm and about 6 nm. Larger quantum dots (e.g., radius of 5-6 nm) emit longer wavelength light resulting in the color of the light being such colors as orange or red. Smaller quantum dots (e.g., radius of 2-3 nm) emit shorter wavelengths resulting in colors such as blue and green. It will be understood that the wavelength of light emitted from the quantum dots may vary depending on the exact composition of the quantum dots. Quantum dots naturally produce monochromatic light. Exemplary compositions of the quantum dots include $LaF_3$ quantum dot nanocrystals that are doped (e.g., coated) with Yb—Er, Yb—Ho and/or Yb—Tm. Other types of quantum dots that can be used include various types of tetrapod quantum dots and perovskite-enhanced quantum dots. It will be understood that one or more types of quantum dots may be mixed or otherwise used in the semiconductor layer 38 to achieve a desired color or hue to the second emission 42.

The quantum dot embodiments of the photoluminescent semiconductor material 38B may be configured to emit light in response to an excitation emission (e.g., the first emission 22). According to various embodiments, the quantum dots may be configured to emit light by up-converting excitation light. Up-conversion works by absorbing two or more photons of a longer wavelength excitation emission. Once absorbed, the quantum dots may emit one or more photons having a shorter wavelength than the wavelengths of the excitation emission. According to various embodiments, the excitation emission may be infrared light. In such embodiments, the excitation emission may have a wavelength of between about 800 nm and about 1000 nm. In the specific embodiment, the excitation emission may have a wavelength of about 980 nm. A 980 nm wavelength is chosen since red, blue and green emitting colloidal quantum dots of these species can efficiently absorb this wavelength of light. This wavelength of light may be readily emitted from heated emissions components (e.g., the first emission 22 from the tail pipe 18). This means the semiconductor layer 38 can emit virtually any color including white, except shades of purple, when charged or excited with infrared light and the proper sized quantum dots are used.

According to various embodiments, the semiconductor layer 38 may be structurally formed as a film. In a first method of forming the semiconductor layer 38, the photoluminescent semiconductor material 38B may be blended directly into the binder 38A. Next, the mixture of semiconductor material 38B and binder 38A may be extruded into a thin sheet of film. Another exemplary method of producing the semiconductor layer 38 is to apply a thin coating of the semiconductor material 38B to a surface. To do this, the semiconductor material 38B is first blended into a polymer or a polymerizable mixture of monomers. Next, the mixture is then spin coated, ink jetted or otherwise applied as a thin layer over a surface (e.g., of a film, substrate or vehicle component). Monomer mixtures can be polymerized (cured) on the surface after application. Using this approach, it may be important to assure that the polymer or monomer mixture is lipophilic (non-polar) if organic soluble semiconductor material 38B is being used. Conversely, if water-soluble photoluminescent semiconductor material 38B is being used, the polymer or monomers may be hydrophilic (water soluble).

With continued reference to FIGS. 3 and 4, the overmold 46 is arranged over the semiconductor layer 38. In some embodiments, the overmold 46 may include a plastic, silicon, or urethane material and is molded over the semiconductor layer 38. Preferably, the overmold 46 should be at least partially light transmissible. In this manner, the overmold 46 will be illuminated by the second emission 42 of the semiconductor layer 38. Additionally, by over-sealing using the overmold 46, it may also function to protect the semiconductor layer 38. The overmold 46 may be arranged in a planar shape and/or an arcuate shape to enhance its viewing potential when in a luminescent state. Light source 84 may benefit from a thin design, thereby helping to fit into small package spaces of the vehicle 10.

The overmold 46 of the light source 84 may also include optics 100 that are configured to direct the second emission 42 emitted from the semiconductor layer 38 towards predefined locations. For example, the second emission 42 may be directed and/or focused towards a desired feature and/or location proximate to the rear of the vehicle 10 (e.g., the tail pipe 18, behind the vehicle 10, under the vehicle 10, etc.). Further, the overmold 46 may define an indicium 104. The indicium 104 may include a symbol, alphanumeric text, pictures, or another shape configured to impart a meaning. The indicium 104 may be illuminated by the second emission 42.

In operation, the light source 84 is configured to passively illuminate the tail pipe 18, the space underneath and rearward of the vehicle 10. As the tail pipe 18 increases in temperature (e.g., by absorbing heat from the exhaust gases), the tail pipe 18 reaches a temperature sufficiently high to begin releasing thermal radiation as the first emission 22. As the first emission 22 is emitted from the tail pipe 18 and passes through the overmold 46 and contacts the semiconductor layer 38, the semiconductor layer 38 is excited and emits the second emission 42. The second emission 42, being a longer wavelength (e.g., less than 800 nanometers, less than 700 nanometers, less than 600 nanometers, less than 500 nanometers, less than 400 nanometers) is visible to a human eye as illumination.

Use of the present disclosure may offer a variety of advantages. First, use of the light source 84 incorporating the semiconductor layer 38 may provide for passive illumination of the tail pipe 18, the space underneath the vehicle 10 and/or rearward of the vehicle 10. Passive illumination may be advantageous in that wiring or other methods of transmitting electrical energy may not be required in order to provide aesthetically pleasing illumination to the tail pipe 18. Further, additional illumination on a rear of the vehicle 10 may provide an enhanced safety to the vehicle 10. Second, the light source 84 may work continuously as long as the tail pipe 18 is of a sufficient temperature. As such, a decreased electrical load on the vehicle 10 may be achieved. Third, the light source 84 incorporating the semiconductor layer 38 may be applied to any heat shield located along the emissions system 14, such that passive illumination may be realized at a variety of points along the vehicle 10. For example, the light source 84 and/or the semiconductor layer 38 may be applied all along the emissions system 14 to provide an aesthetically pleasing and safety enhancing underbody light to the vehicle 10. Fourth, as the rear of the vehicle 10 is often exposed to harsh environmental conditions (e.g., water, dirt, road grime, rocks, high temperatures, etc.), placement of an electrical light and its associated electrical connections may prove difficult. Utilizing the passive light source 84 and semiconductor layer 38 of the present disclosure may allow a robust and mechanically simple illumination source for the rear and underbody of the vehicle 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other materials, exemplary embodiments of the disclosure disclosed herein may be formed from a wide variety of unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovation have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:
1. A vehicle emissions system, comprising:
 a tail pipe configured to emit a first emission;
 a heat shield positioned proximate the tail pipe and having a shield substrate wherein ambient air extends between the heat shield and the tail pipe; and a semiconductor layer positioned between and in contact with a tie layer and an overmold, the tie layer in contact with the shield substrate, wherein the semiconductor layer is configured to convert the first emission into a second emission and a space is defined between the semiconductor layer and the tail pipe.

2. The vehicle emissions system of claim 1, wherein the semiconductor layer comprises a plurality of quantum dots.

3. The vehicle emissions system of claim 1, wherein the overmold is at least partially transparent.

4. The vehicle emissions system of claim 1, wherein the second emission is emitted toward the tail pipe.

5. The vehicle emissions system of claim 1, wherein the first emission has a wavelength greater than about 800 nm and the second emission has a wavelength of less than about 800 nm.

6. The vehicle emissions system of claim 1, wherein the semiconductor layer is positioned between the heat shield and the tail pipe.

7. The vehicle emissions system of claim 1, wherein the overmold defines optics configured to shape the second emission.

8. The vehicle emissions system of claim 2, wherein the plurality of quantum dots are suspended in polymethylmethacrylate.

9. A vehicle, comprising:
   an emissions system comprising at least one of a tail pipe, a muffler and a catalytic converter, the emissions system configured to emit a first emission having a wavelength greater than about 800 nm;
   a heat shield spaced apart by ambient air from the emissions system; and
   a semiconductor layer comprising quantum dots coupled with the heat shield configured to absorb the first emission and emit a second emission.

10. The vehicle of claim 9, wherein the first emission has a longer wavelength than the second emission.

11. The vehicle of claim 9, wherein an overmold in contact with the semiconductor layer defines an indicium configured to be illuminated by the second emission.

12. The vehicle of claim 9, wherein the second emission is configured to illuminate a space under the vehicle.

13. A vehicle, comprising:
   a tail pipe configured to emit a first emission;
   a heat shield spaced apart from the tail pipe with ambient air in-between the heat shield and the tail pipe, wherein a gap is defined between the tail pipe and the heat shield; and
   a semiconductor layer in contact with the heat shield and configured to absorb the first emission and emit a second emission.

14. The vehicle of claim 13, wherein the first emission has a longer wavelength than the second emission.

15. The vehicle of claim 14, wherein the second emission has a wavelength of less than about 800 nm.

16. The vehicle of claim 15, wherein the semiconductor layer comprises a plurality of quantum dots.

17. The vehicle of claim 16, wherein the tail pipe is illuminated by the second emission.

* * * * *